United States Patent
Millner et al.

(10) Patent No.: US 9,400,139 B2
(45) Date of Patent: Jul. 26, 2016

(54) DEVICE FOR THE CLOSED-LOOP CONTROL OF PROCESS GASES IN A PLANT FOR PRODUCING DIRECTLY REDUCED METAL ORES

(75) Inventors: Robert Millner, Loosdorf (AT); Jan-Friedemann Plaul, Linz (AT); Norbert Rein, Vienna (AT); Gerald Rosenfellner, Ertl (AT)

(73) Assignee: PRIMETALS TECHNOLOGIES AUSTRIA GMBH (AT)

( * ) Notice: Subject to any disclaimer, the term of this patent is extended or adjusted under 35 U.S.C. 154(b) by 215 days.

(21) Appl. No.: 14/128,103

(22) PCT Filed: Jun. 1, 2012

(86) PCT No.: PCT/EP2012/060355
§ 371 (c)(1),
(2), (4) Date: Dec. 20, 2013

(87) PCT Pub. No.: WO2012/175313
PCT Pub. Date: Dec. 27, 2012

(65) Prior Publication Data
US 2014/0138884 A1    May 22, 2014

(30) Foreign Application Priority Data
Jun. 21, 2011 (AT) .................................. A 906/2011

(51) Int. Cl.
*F27D 19/00* (2006.01)
*B01D 53/75* (2006.01)
(Continued)

(52) U.S. Cl.
CPC ............... *F27D 19/00* (2013.01); *B01D 53/75* (2013.01); *F27D 17/00* (2013.01); *B01D 53/047* (2013.01);
(Continued)

(58) Field of Classification Search
CPC ................................ F27D 19/00; F27D 17/00
USPC ........................................................... 266/89
See application file for complete search history.

(56) References Cited

U.S. PATENT DOCUMENTS 5,234,490 A * 8/1993 Kundrat .................... C21B 5/06
                                                    266/156
5,545,251 A    8/1996 Knop ............................. 75/444
(Continued)

FOREIGN PATENT DOCUMENTS

CN    1109102 A    9/1995
CN    1413266 A    4/2003
(Continued)

OTHER PUBLICATIONS

International Search Report and Written Opinion dated Sep. 3, 2012 issued in corresponding international patent application No. PCT/EP2012/060355.

*Primary Examiner* — Scott Kastler
(74) *Attorney, Agent, or Firm* — Ostrolenk Faber LLP

(57) ABSTRACT

A device for closed-loop control of process gases (11) in a plant (8) for producing directly reduced metal ores includes at least one reduction unit (10), an appliance upstream of the reduction unit (10) for separating gas mixtures (18), a gas purification appliance (13) connected downstream of the reduction unit (10) for rate control of process gases (11). Process gases (11) are obtained by recycling from the production process itself and from a plant for pig iron generation (1) via a supply conduit (16). An open-loop pressure control appliance (15) upstream of a junction of the supply conduit (16) into a return conduit (14) for the process gases (11) such that a pressure level for the appliance for separating gas mixtures (18) is kept constant and the process gases (9,11) are controlled in a closed-loop manner in a plant for producing directly reduced metal ores (8).

9 Claims, 1 Drawing Sheet

(51) Int. Cl.
*F27D 17/00* (2006.01)
*B01D 53/047* (2006.01)
*B01D 53/14* (2006.01)
*C21B 13/00* (2006.01)
*C21B 13/02* (2006.01)

(52) U.S. Cl.
CPC ....... *B01D 53/1475* (2013.01); *B01D 2257/504* (2013.01); *B01D 2258/025* (2013.01); *C21B 13/002* (2013.01); *C21B 13/02* (2013.01); *C21B 2100/02* (2013.01); *Y02P 10/212* (2015.11)

(56) References Cited

U.S. PATENT DOCUMENTS 6,802,887 B1    10/2004    Wieder ........................... 75/528
2010/0230872 A1*    9/2010    Devaux .................... C21B 5/00
                                                              266/44
2011/0138965 A1    6/2011    Boehm et al.
2011/0283837 A1    11/2011    Millner et al.
2014/0138884 A1*    5/2014    Millner .................. B01D 53/75
                                                              266/89

FOREIGN PATENT DOCUMENTS

| DE | 43 26 562 | 2/1995 |
| JP | 61-99611 | 5/1986 |
| WO | WO 2008/146112 | 12/2008 |
| WO | WO 2009/037587 | 3/2009 |
| WO | WO 2009/146982 | 12/2009 |
| WO | WO 2010/046211 | 4/2010 |
| WO | WO 2011/029792 A1 | 3/2011 |

* cited by examiner

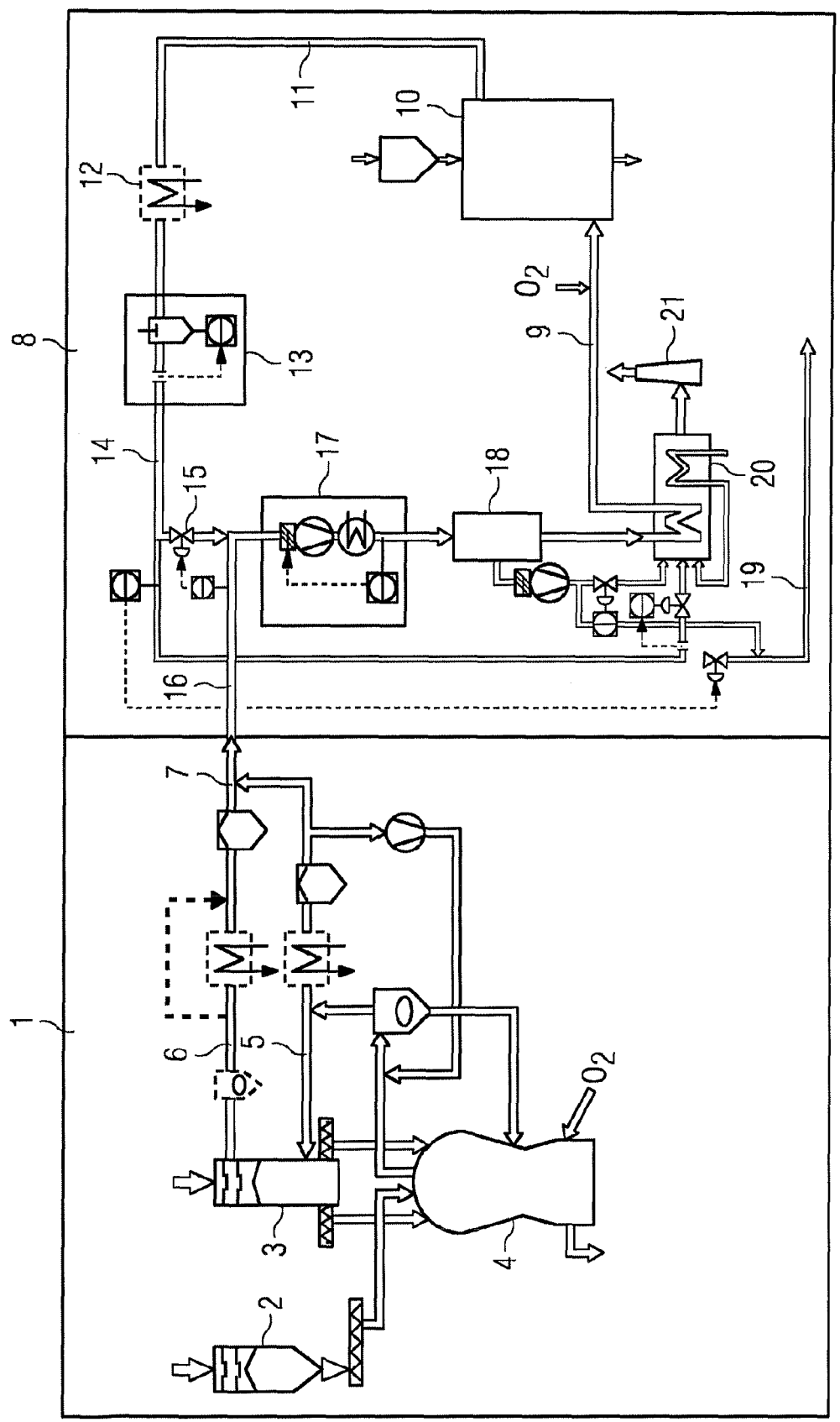

DEVICE FOR THE CLOSED-LOOP CONTROL OF PROCESS GASES IN A PLANT FOR PRODUCING DIRECTLY REDUCED METAL ORES

CROSS-REFERENCE TO RELATED APPLICATIONS

The present application is a 35 U.S.C. §§371 national phase conversion of PCT/EP2012/060355, filed Jun, 1, 2012, which claims priority of Austrian Application No. A 906/2011, filed Jun. 21, 2011, the contents of which are incorporated by reference herein. The PCT International Application was published in the German language.

FIELD OF TECHNOLOGY

The invention relates to a device for the closed-loop control of process gases in a plant for producing directly reduced metal ores. In this case, a plant for producing directly reduced metal ores or metals, in particular iron, comprises at least one reduction unit (e.g. fluidized-bed reactor system, fixed-bed reduction shaft or e.g. MIDREX® reduction shaft, etc.), an appliance for separating gas mixtures, this being connected upstream of the reduction unit and having an assigned compressor appliance, and a gas purification appliance which is connected downstream of the reduction unit. In this case, the process gases required for the production of directly reduced metal ores are in part obtained by recycling from the production process itself and in part supplied from a plant for pig iron production, such as e.g. a smelting reduction plant, via a supply conduit which opens into a return conduit for the process gases.

PRIOR ART

So-called direct reduction of metal ores or metals, in particular iron ore or iron oxide, can take place in a dedicated plant (a so-called direct reduction plant), for example. Such a plant for producing directly reduced metals or sponge iron, also referred to as directly reduced iron (DRI), usually comprises at least one reduction unit such as e.g. a fixed-bed reduction shaft, a fluidized-bed reactor system, etc., depending on whether the metal for reduction is provided in lumped form or as fine particles, for example, and/or is required for the subsequent processing associated with pig iron, products similar to pig iron, or for steel production, etc.

In the case of direct reduction of metal ores or iron ore, the material to be reduced (e.g. metal ore, iron ore, iron oxide, etc.) is introduced into the at least one reduction unit of the plant in lumped form, e.g. as lump ore or pellets, or as fine particles. The material is then exposed to a flow of process gas (the so-called reduction gas) in the reduction unit using the countercurrent principle. In this way, the material (e.g. iron oxide) is completely or partially reduced by the reduction gas to form so-called sponge iron, for example, and the reduction gas is oxidized in this case. The reduced material (e.g. sponge iron) then exhibits e.g. a metallization level of approximately 45% to more than 95%.

The process gases which are required for the reduction, e.g. the reduction gas, are obtained e.g. in a melter gasifier, e.g. in the case of a smelting reduction process (e.g. COREX®, FINEX®, etc.), or coal gasifier and are preferably discharged into the central to lower quarter of the reduction unit, or preferably into the first fluidized-bed reactor in the case of fluidized-bed reactors. The reduction gas which has been generated e.g. in a melter gasifier is preferably 750° C. to 1000° C. hot, dust-laden and rich in carbon monoxide and hydrogen (e.g. containing 70% to 90% CO and $H_2$). The reduction gas rises in the reduction unit, or from reactor to reactor in the case of a fluidized-bed reactor, thereby reducing the material (e.g. metal ore, iron ore, iron oxide, etc.), preferably in the countercurrent. The reduction gas is then drained off from the reduction unit as a so-called off-gas.

It is purified by means of a gas purification appliance (e.g. gas scrubber) which is connected downstream of the reduction unit, and forwarded at least in part as so-called recycle gas for treatment in an appliance for separating gas mixtures, in particular a $CO_2$ removal appliance (e.g. pressure-swing adsorption or vacuum pressure-swing adsorption, etc.), said appliance being connected upstream of the reduction unit and having an assigned compressor appliance. Following the treatment in the appliance for separating gas mixtures, the gas can be discharged back into the reduction unit as a reduction gas, wherein a pressure which is required for the appliance for separating gas mixtures and is built up by the assigned compressor appliance (e.g. compressor) must be brought down or reduced again.

In addition to the e.g. partial recycling of the process gases used in the plant, use is made of a so-called export gas for the reduction process in the reduction unit, said export gas being extracted e.g. from pig iron production processes or from a smelting reduction process such as e.g. COREX® or FINEX® because it can no longer be used there. The term "export gas" is used in particular to designate that part of the so-called top gas which is extracted from the smelting reduction process or from the pig iron production process, being generally cooled and dedusted (in particular dry-dedusted), and possibly further process gases such as e.g. excess gas from the melter gasifier. Top gas usually signifies the used reduction gas from a blast furnace, a melter gasifier or a reduction shaft/fluidized-bed reactor in this case.

If the export gas is extracted from one or more smelting reduction plants, e.g. based on the COREX® and/or FINEX® methods for generating directly reduced metal, such a plant is referred to as a so-called integrated plant. In this case, the export gas is introduced via a supply conduit into the plant for producing directly reduced metal or iron, and used in the respective reduction unit (e.g. fluidized-bed reactor system, reduction shaft furnace, MIDREX® reduction shaft, etc.), wherein the supplied export gas can mix with the recycle gas of the plant for producing directly reduced metal ores or iron.

However, pressure differences usually occur between the supplied export gas and the process gases of the plant for producing directly reduced metal, and pressure values having an overpressure of approximately 0.8 bar to approximately 2 bar can occur in the feed conduit of the export gas. In addition to this, the rate of the export gas supplied from one or more smelting reduction plants can fluctuate by up to 10%, for example, resulting in fluctuations in the flow rate of the process gases in the reduction process.

In order to ensure optimal functioning of the reduction process in the plant for producing directly reduced metal or iron, an almost constant input pressure is required at the appliance for separating gas mixtures and at the assigned compressor appliance. The input pressure at the compressor appliance should normally be e.g. constant at approximately 2 bar overpressure and the input pressure level at the appliance for separating gas mixtures should normally be e.g. constant at approximately 3 to 8 bar overpressure in order to achieve efficient and cost-effective removal of $CO_2$ from the process gases.

Furthermore, an almost constant rate of reduction gas is required in the reduction unit. This almost constant gas rate and/or a ratio of reduction gas rate to directly reduced material (metal, iron (DRI), etc.) determines the product quality of the directly reduced metal or iron, for example. Therefore a specifically selected, almost constant rate of reduction gas is required in the reduction unit according to the desired product quality.

Therefore one or more compressors are normally used in integrated plants, for example, for a closed-loop control of the export gas pressure and for a constant input pressure at the compressor appliance assigned to the appliance for separating gas mixtures. This compressor or these compressors are mounted e.g. in a return conduit for the recycle gas and ahead of a junction of the feed conduit of the export gas. Moreover, the flow control for adjustments to the specific desired rate of reduction gas for the reduction process is effected by means of a complex and expensive valve station, which is mounted between the appliance for separating gas mixtures and a heating appliance for the reduction gas, this being connected upstream of the reduction unit.

This usually involves a significant pressure drop, due to a relatively high operating pressure that is required in the appliance for separating gas mixtures, particularly when using vacuum pressure-swing adsorption (VPSA), and a relatively low operating pressure of the reduction unit. Using a pressure-swing plant and a so-called MIDREX® reduction shaft as a reduction unit, for example, approximately 1 to 5 bar are lost as a result of the operating pressure that is required in each case. In addition to a significant pressure loss resulting from the flow control via the valve station, the use of one or more compressors in the recycle gas conduit has the disadvantage that both the capital and maintenance costs for the plant are relatively high.

STATEMENT OF THE INVENTION

The object of the invention in therefore to provide a simple device for the closed-loop control of process gases in a plant for producing directly reduced metal ores or iron, whereby pressure losses within the plant can be reduced or avoided and costs can be reduced in a simple manner.

This object is achieved by means of a device of the type described in the introduction, wherein the gas purification appliance connected downstream of the at least one reduction unit is equipped to allow rate control of the process gases. The device further comprises an open-loop pressure control appliance which is mounted ahead of a junction of the supply conduit into a return conduit for the process gases, in particular the so-called off gas, such that a pressure level for the appliance for separating gas mixtures and assigned compressor appliance is held constant.

The main aspect of the solution proposed according to the invention consists in the closed-loop control of the pressure of the process gases, particularly in the case of a mixture of recycle gas (=off gas in the return conduit or recycle gas conduit of the plant) and export gas supplied from a plant for the production of pig iron (in particular a smelting reduction plant based on e.g. the COREX® and/or FINEX® method), by means of an open-loop pressure control appliance comprising e.g. pressure-maintaining valves, expansion turbine, etc. Despite pressure fluctuations, primarily in the supply conduit of the export gas, it is therefore possible to ensure a constant pressure level of approximately 2 bar overpressure at the input of the assigned compressor appliance (e.g. compressor) of the appliance for separating gas mixtures and a constant pressure level at the appliance for separating gas mixtures (e.g. (V)PSA, etc.). The compressors in the return conduit or recycle gas conduit are therefore no longer required and both capital costs and maintenance costs are reduced in respect of the plant for producing directly reduced metal ores or iron. The continuous operating costs are also reduced due to a low power requirement of the plant.

The gas purification appliance (e.g. gas scrubber, etc.) that is connected downstream of the reduction unit is used for closed-loop control or adjustment of the rate at which process gases, particularly reduction gas, are ultimately supplied to the reduction unit. For this purpose, the gas purification appliance has a device for open-loop control of the through-flow such as e.g. a straightway valve, adjustable venturi neck, etc. This device for open-loop control of the through-flow is therefore used to define the rate at which process gases are purified in and flow through the gas purification appliance. It is therefore possible to dispense with a complex and expensive valve station for the flow control, this being mounted between the appliance for separating gas mixtures and a heating appliance for the reduction gas, said heating appliance being connected upstream of the reduction unit. In addition to the cost savings, rate control and/or flow control by means of the gas purification appliance reduces or avoids pressure losses within the plant for producing directly reduced metal ores or iron. Ideally, the inventive device can also be used in different reduction units such as fluidized-bed reactor systems, a fixed-bed reduction shaft or MIDREX® reduction shaft, for example.

The rate control of the process gases of the gas purification appliance is advantageously embodied in such a way that a rate of process gases supplied to the reduction unit is adjusted and held constant. By virtue of the device for open-loop control of the through-flow in the gas purification appliance, a rate of reduction gas can very easily be adjusted for the actual reduction unit in use. In addition, the rate control and/or through-flow control in the gas purification appliance connected downstream of the reduction unit has the advantage that a differential pressure (e.g. typically from 0.3 to 0.5 bar) can be optimized for the gas purification appliance in respect of scrubbing effect.

An advantageous development of the inventive device also has a drain for closed-loop control of the pressure ahead of the open-loop pressure control appliance, via which excess quantities of process gas can be drained off, particularly as export gas of the plant for the production of directly reduced metals or iron. In this case, provision is advantageously made for a control valve in the drain for excess quantities of process gas. By virtue of said drain, the pressure level for the appliance for separating gas mixtures can be optimally adjusted. Moreover, excess quantities of gas (particularly excess recycle gas) can be drained off as so-called export gas of the plant for producing directly reduced metal ores. It is therefore also possible to adjust the rate of gas for the reduction unit even more accurately, and fluctuations in the rate of export gas that is supplied from the plant for pig iron production can be equalized in a simple manner.

It is advantageous if the appliance for separating gas mixtures is configured as an appliance for pressure-swing adsorption (PSA) or as an appliance for vacuum pressure-swing adsorption (VPSA). Pressure-swing adsorption is normally understood to mean a physical process for separating gas mixtures under pressure by means of so-called adsorption (=adhesion of e.g. specific gas components of the gas mixture such as e.g. $H_2O$, $CO_2$, etc. to a substance or so-called adsorbent). During the production of directly reduced metal ores or iron, $CO_2$ is removed from the process gases by means of the appliance for pressure-swing adsorption, in order that said process gases can be used again for the reduction process in the reduction unit and oxidized.

In the case of an appliance for pressure-swing adsorption (PSA), the gas mixture which must be separated is discharged under high pressure (e.g. approximately 6 to 10 bar) into the appliance, this being filled with an adsorbent, such that the gas mixture flows through the adsorbent in order to adsorb one or more of the components to be removed (e.g. $H_2O$, $CO_2$). The remaining gas mixture leaves the appliance via the output. If the adsorbent is saturated, the process is switched over, e.g. via valves and a reduction in pressure, such that the adsorbed component or components are desorbed again, said component or components being desorbed from the adsorbent. Precise adjustment of a switchover time usually depends on a desired purity of the gases and/or component. When working at a pressure which is at least below atmospheric pressure, the method is also referred to as vacuum pressure-swing adsorption (VPSA), wherein one or more vacuum pumps are usually also required for the purpose of this method. The input pressure of the process gas for the PSA or VPSA in this case is generated by at least one compressor appliance (in particular a compressor) which is connected upstream of the PSA or VPSA.

However, the inventive device has the advantage that, by virtue of the rate control via the gas purification appliance and/or the open-loop pressure control appliance, a higher so-called feed gas pressure can be achieved for the compression for the purpose of separating gas mixtures. This allows the use of a PSA appliance, whereby costs associated with a VPSA appliance and vacuum pumps can be saved.

In an effective development of the inventive device, the open-loop pressure control appliance consists of at least one pressure-maintaining valve, which is mounted ahead of a junction of the supply conduit for the so-called export gas from a plant for pig iron production, such as e.g. a smelting reduction plant, or between first and second compressor stages. A pressure-maintaining valve can be used in a simple and economical manner to adjust the pressure of the process gases, in particular the export gas that is supplied from the plant for producing pig iron, to a pressure level that is constant and preferred for the appliance for separating gas mixtures or $CO_2$ removal. In this case, the export gas from the feed conduit is supplemented as appropriate by off gas or recycle gas from the recycle gas conduit, which has a somewhat higher pressure, in order to achieve a desired pressure level at the input of the compressor appliance which is connected upstream of the appliance for separating gas mixtures.

Depending on the selected pressure level for the appliance for separating gas mixtures and the actual reduction unit in use (e.g. fixed-bed reduction shaft, fluidized-bed reactor system, etc.), the open-loop pressure control appliance can also advantageously take the form of an expansion turbine which is mounted ahead of the junction of the supply conduit for export gas. An expansion turbine can be used not only for closed-loop control of the pressure in this case, but also concurrently to generate electrical energy and/or to provide a substitute, e.g. via a mechanical coupling, for at least part of the mechanical energy of the compressor appliance (e.g. compressor) assigned to the appliance for separating gas mixtures. In this way, it is also possible to reduce the power requirement of the plant for producing directly reduced metal ores or iron.

BRIEF DESCRIPTION OF THE DRAWING

The invention is explained below by way of example with reference to the appended FIGURE. An exemplary and schematic illustration in FIG. 1 shows a structure of the inventive device for the closed-loop control of process gases in a plant for producing directly reduced metals, in particular iron.

EMBODIMENT OF THE INVENTION

In a schematic and exemplary illustration, FIG. 1 shows a structure of a so-called integrated plant for producing directly reduced metal ores, in particular iron, which integrated plant includes the device according to the invention. In the context of an integrated plant, an export gas 7 of a plant for pig iron production 1, in particular a smelting reduction plant, is normally used as a reduction gas 9 for reduction of metal ores, iron ore, etc. in a plant for producing directly reduced metal ores, iron, etc.

A plant for pig iron production 1 such as the smelting reduction plant 1 which is exemplified in FIG. 1 and based on the so-called COREX® method comprises at least one reduction shaft 3 in which the carrier of the metal ore, in particular iron ore (lump ore, pellets, sinter), is reduced by means of a reduction gas 5 of the smelting reduction plant 1. In this case, the reduction gas 5 of the smelting reduction plant 1 is generated in a melter gasifier 4 by gasifying coal from a coal/small ore container 2 (and possibly a small proportion of coke) with oxygen (90% or more).

The reduction gas 5 is partly discharged from the melter gasifier 4 into the lower part of the reduction shaft 3 and is drained off again at the top as a so-called top gas 6. The top gas 6 is then freed of coarse dust in a dust separator or cyclone, cooled in a cooling appliance and purified in a gas purification appliance or a gas scrubber. A conduit which drains off part of the reduction gas 5 (so-called excess gas) also opens into the conduit of the top gas 6 of the smelting reduction plant. The reduction gas 5 is also cooled and purified in a gas scrubber. The top gas 6 and the supplied reduction gas 5 are then drained off from the smelting reduction plant 1 or COREX® plant as so-called export gas 7 and supplied via a supply conduit 16 to the plant for producing directly reduced metal ores 8.

In addition to the COREX® method in which, as a two-stage smelting reduction process (=combination of a direct reduction process (prereduction from e.g. iron ore to sponge iron) with a smelting process (main reduction)), a metal ore (e.g. iron ore) is introduced in lumped form (e.g. lump ore, pellets, etc.), the export gas 7 can also be taken from a smelting reduction plant 1 which is based on the FINEX® method or from a coal gasification plant. In the case of the FINEX® method, the metal ore or iron ore is introduced as small ore and the prereduction takes place in a fluidized-bed reactor system, for example.

The export gas 7 reaches the plant for producing directly reduced metal ores 8, or the DR plant 8, as process gas via the supply conduit 16. In this case, the supply conduit 16 opens into a return conduit 14 in which the so-called off gas or recycle gas 11 of the DR plant 8 is again prepared for the reduction process and returned.

The export gas 7 and the recycle gas 11 are supplied to a compressor appliance 17, e.g. a compressor. It should be noted that a pressure difference exists between the export gas 7 and the recycle gas 11 in this case. The export gas has e.g. a pressure of 1 to 2 bar overpressure in this case. The recycle gas 11 has e.g. a pressure of approximately 2.5 bar overpressure. Moreover, the supplied export gas 7 also fluctuates in terms of rate (e.g. by 10%). In order to ensure that the pressure remains constant at the input of the compressor 17, and also therefore at an appliance for separating gas mixtures 18 which is connected downstream of said compressor and requires a constant pressure level of e.g. 6 bar overpressure, an open-loop pressure control appliance 15 is provided in the return conduit 14 ahead of the junction of the supply conduit 16. For example, a pressure-maintaining valve 15 can be provided as an open-loop pressure control appliance 15. The recycle gas 11 which is not required for closed-loop control of the pressure and for equalizing the flow rate can be diverted, e.g. via a drain 19 as so-called export gas of the DR plant 8. This drain 19 likewise has a valve for the purpose of pressure control.

Downstream of the compressor 17, the process gas 7 is supplied to the appliance for separating gas mixtures 18 for the purpose of $CO_2$ removal. For example, this appliance 18 can be embodied as an appliance for pressure-swing adsorption 18 (PSA) if the pressure level is sufficiently high. If a lower pressure level has to be selected for the appliance for separating gas mixtures 18, e.g. due to a reduction unit 10 that is being utilized, it is also possible to install a so-called vacuum pressure-swing adsorption appliance 18 (VPSA). The process gas, from which $CO_2$ has been removed, is then heated in a heating appliance 20 for the reduction process and forwarded to the reduction unit 10 as a reduction gas 9. Part of the process gas is used thermally in the reduction gas furnace to heat up the process gas (which has been largely purified of $CO_2$), and is released as waste gas via a waste gas disposal 21.

Oxygen $O_2$ can also be added to the reduction gas 9 for the purpose of partial combustion and associated temperature increase. The reduction gas 9 is then discharged into the reduction unit 10, in which is situated the material that is to be reduced (e.g. metal ore, iron ore, etc.) and has been supplied via a material feed, in order to reduce said material in the countercurrent. A fixed-bed reduction shaft, MIDREX® reduction shaft or fluidized-bed reactor system can be used as a reduction unit 10, depending on the material that is provided for reduction (ore in lumped form, pellets, small ore, etc.).

The reduction gas 9 is then drained off from the upper part of the reduction unit 10 as off gas, top gas or recycle gas 11 and cooled in a cooling appliance 12. A gas purification appliance 13 connected downstream of the reduction unit 10 is provided for the purification of the recycle gases 11. The gas purification appliance 13 has an appliance for open-loop control of the through-flow such as e.g. a straightway valve or an annular gap scrubber, etc. This valve in the gas purification appliance 13 is then used to adjust a rate of process gases 7, 11 which is necessary or desired for the flow control or rate control for the reduction unit 10. The purified recycle gas 11 is then supplied back to the reduction process via the return conduit 14 and through the open-loop pressure control appliance 15.

Depending on the pressure level which is selected for the appliance for separating gas mixtures 18 or removing $CO_2$ and for the reduction unit 10, an expansion turbine can also be used as an open-loop pressure control appliance 15 in the return conduit 14 instead of a pressure-maintaining valve 15. In this case, the expansion turbine simultaneously controls the pressure and e.g. generates electrical energy which can be used e.g. for the compressor 17 in the DR plant 8. Moreover, if a higher pressure (e.g. 3 to 6 bar) is selected for the reduction unit 10, said reduction unit 10 can have a small size, for example, and the size of the appliance for separating gas mixtures 18 can also be smaller, for example, since a hydraulic restriction (usually dependent on an operating volume flow) is a determining factor for a capacity limit.

LIST OF REFERENCE CHARACTERS

1 Plant for pig iron production, in particular a smelting reduction plant
2 Coal/small ore container
3 Reduction shaft
4 Melter gasifier
5 Reduction gas of the smelting reduction plant
6 Top gas of the smelting reduction plant
7 Export gas of the smelting reduction plant
8 Plant for producing directly reduced metal ores or iron (DR plant)
9 Reduction gas
10 Reduction unit with material feed
11 Off gas, top gas or recycle gas
12 Cooling appliance
13 Gas purification appliance with means for open-loop control of the rate (e.g. annular gap scrubber)
14 Return conduit
15 Open-loop pressure control appliance
16 Supply conduit for export gas of the smelting reduction plant
17 Compressor appliance (e.g. compressor)
18 Appliance for separating gas mixtures—$CO_2$ removal
19 Drain for export gas of the DR plant
20 Heating appliance for reduction gas (e.g. reduction gas furnace)
21 Waste gas disposal

The invention claimed is:

1. A device for closed-loop control of process gases in a plant for producing directly reduced metal ores, the device having:
   at least one reduction unit;
   an appliance configured for separating gas mixtures and an assigned compressor appliance, both of the gas mixture separating appliance and the compressor appliance being connected upstream of the reduction unit with respect to the flow of gases;
   a gas purification appliance connected downstream of the reduction unit with respect to the flow of gases, the gas purification appliance is configured for rate control of rate of supply of process gases to the reduction unit;
   a supply conduit that supplies export gases from a plant for pig iron production for supplying at least part of the process gases for the plant for producing directly reduced metal ores;
   a return conduit for process gases from the reduction unit;
   a junction of the supply conduit into the return conduit for the process gases from the reduction unit; and
   an open-loop pressure control appliance mounted ahead of the junction to supply recycle gas from the at least one reduction unit to the junction to adjust the pressure of the export gases to hold a pressure level for the appliance for separating gas mixtures and for the assigned compressor appliance constant.

2. The device as claimed in claim 1, wherein the gas purification appliance is configured such that the control rate of the process gases supplied to the reduction unit is adjusted and held constant.

3. The device as claimed in claim 1, further comprising a drain located and configured for draining off excess quantities of process gas, the drain is provided ahead of the open-loop pressure control appliance and is configured for the purpose of closed-loop control of the pressure.

4. The device as claimed in claim 3, wherein the drain for draining excess quantities of process gas has a control valve.

5. The device as claimed in claim 1, wherein the appliance for separating gas mixtures is configured as an appliance for pressure-swing adsorption or as an appliance for vacuum pressure-swing adsorption.

6. The device as claimed in claim 1, wherein the open-loop pressure control appliance comprises at least one pressure-maintaining valve which is mounted ahead of the junction of the supply conduit and the reduction conduit for the process gases.

7. The device as claimed in claim 1, wherein the open-loop pressure control appliance comprises an expansion turbine which is mounted ahead of the junction of the supply conduit and the reduction conduit for the process gases.

8. The device as claimed in claim 1, wherein the plant for pig iron production is a smelting reduction plant.

9. A device for closed-loop control of process gases in a plant for producing directly reduced metal ores, the device having:

at least one reduction unit;

an appliance configured for separating gas mixtures and an assigned compressor appliance, both of the gas mixture separating appliance and the compressor appliance being connected upstream of the reduction unit with respect to the flow of gases;

a gas purification appliance connected downstream of the reduction unit with respect to the flow of gases, the gas purification appliance is configured for rate control of the process gases;

a supply conduit that supplies export gases from a plant for pig iron production for supplying at least part of the process gases for the plant for producing directly reduced metal ores;

a return conduit for process gases from the reduction unit;

a junction of the supply conduit into the return conduit for the process gases from the reduction unit; and an open-loop pressure control appliance mounted ahead of the junction to supply recycle gas from the at least one reduction unit to the junction to adjust the pressure of the export gases so that a pressure level for the appliance for separating gas mixtures and for the assigned compressor appliance is held constant, wherein the open-loop pressure control appliance comprises an expansion turbine which is mounted ahead of the junction of the supply conduit and the reduction conduit for the process gases.

* * * * *